(No Model.)

H. DEVEAU.
GRAVE SIGNAL.

No. 522,110.  Patented June 26, 1894.

WITNESSES:
William Goebel
C. Sedgwick

INVENTOR
H. Deveau
BY Munn & Co
ATTORNEYS.

UNITED STATES PATENT OFFICE.

HUBERT DEVEAU, OF NEW YORK, N. Y.

GRAVE-SIGNAL.

SPECIFICATION forming part of Letters Patent No. 522,110, dated June 26, 1894.

Application filed January 2, 1894. Serial No. 495,319. (No model.)

*To all whom it may concern:*

Be it known that I, HUBERT DEVEAU, of New York city, in the county and State of New York, have invented a new and Improved Grave-Signal, of which the following is a full, clear, and exact description.

My invention relates to improvements in that class of devices which are adapted to be applied to the coffin in which a person is buried, and which, in case the victim revives and moves, operates to attract attention so that the buried individual may be rescued.

The object of my invention is to produce a very simple device of this character, which may be conveniently applied to a coffin and box when an interment takes place, which has its operating mechanism contained in a closed case so that it cannot be tampered with by the malicious or mischievously disposed, which under normal conditions keeps the coffin hermetically sealed, which however, when the victim of a premature burial, struggles, admits air to the coffin, thus enabling the victim to breathe and revive; which also at the same time that it admits air, displays a signal above the ground, adapted to attract attention to the fact that the supposed dead is alive, and which may be conveniently removed after a sufficient time has elapsed to make certain that the buried party is actually dead, and applied to another coffin.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
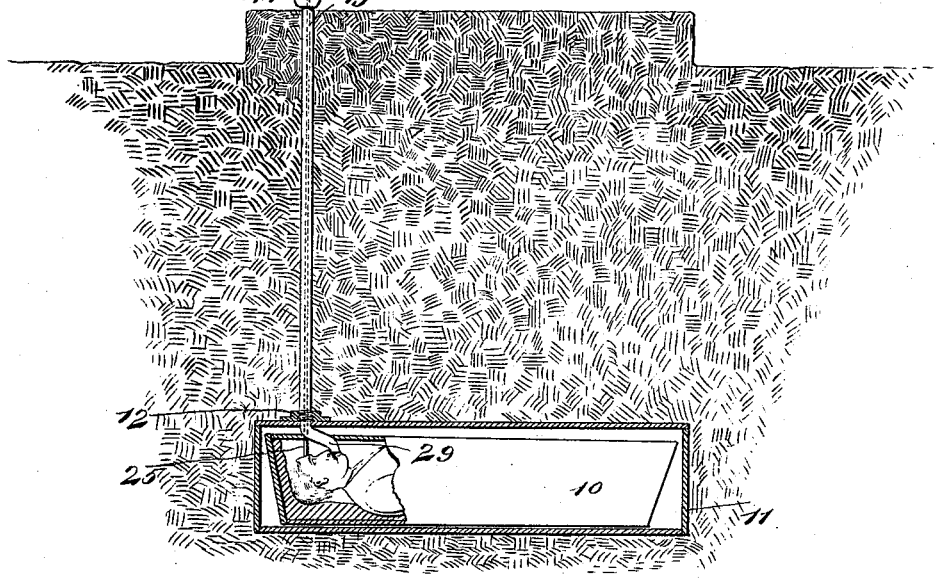
Figure 2:
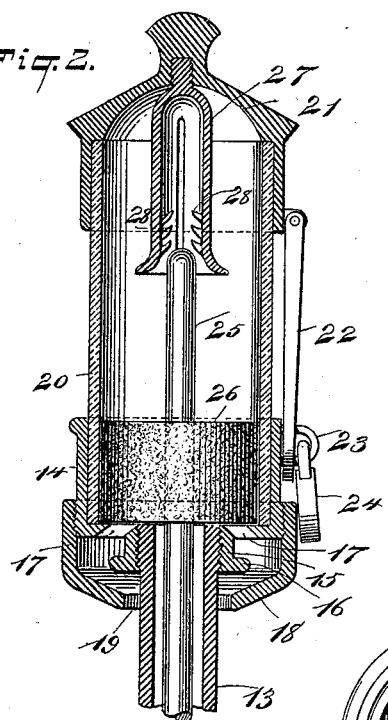
Figure 3:
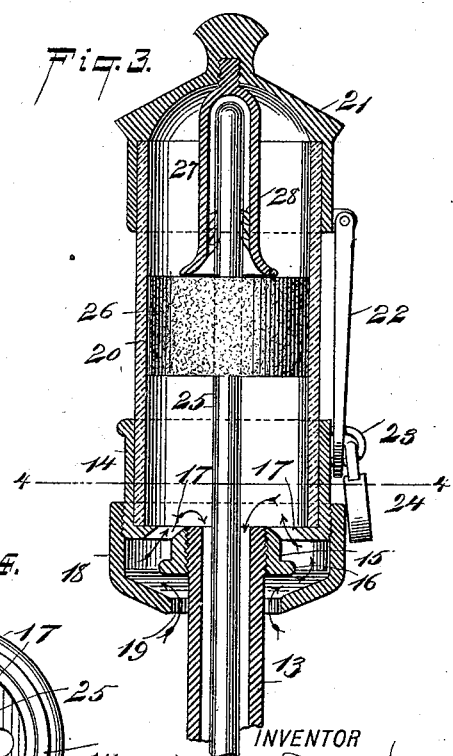
Figure 4:
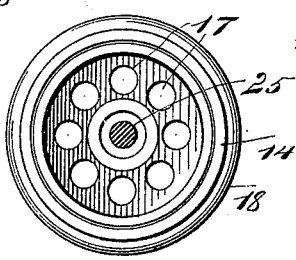

Figure 1 is a broken sectional view illustrating the application of my signal to a buried coffin. Fig. 2 is an enlarged detail longitudinal section of the upper portion of the apparatus, that is, the part which is arranged above the ground, the view showing the combined signal and valve arranged to close the air ports through which air is conducted to a coffin. Fig. 3 is a similar view, but with the signal and valve raised; and Fig. 4 is a sectional plan view on the line 4—4 of Fig. 3.

In the accompanying drawings, 10 represents an ordinary coffin which is buried in the box 11 in the usual way, the box being shown in its position in the grave covered by earth. On the box is a screw cap or nipple 12, which is arranged best around a hole in the box, and this is adapted to receive the threaded end of an air pipe 13, which pipe is long enough to extend upward above the ground; and it will be understood that instead of connecting a pipe with the box as described, the same sort of connection may be made with a coffin board. The pipe 13 may be made long enough to extend above a deep grave, and may then be cut off to any desired length. Its upper end carries a transparent case having the lower cup or socket 14 preferably of metal, which has a depending nipple 15 apertured to screw on the pipe 13, and a base flange 16 projecting laterally from the pipe and beneath the diagonal air ports 17 in the bottom of the cup or socket 14.

To the lower and outer side of the cup or socket 14 is screwed a casing 18, which serves as an air chamber which encircles the pipe 13, a hole 19 being left around the pipe, as shown clearly in Figs. 2 and 3, so that the outer air may freely enter the casing. In the cup or socket 14 rests the glass body portion 20 of the signal casing, the upper end of this body portion being contained in a metallic cap 21 which has upon one side a hasp 22, this being hinged to the cap and apertured to engage a staple 23 on the cup or socket 14 to which it is held by means of an ordinary padlock 24. Any other suitable means may be used for locking the case however.

Extending downward through the pipe 13 is a rod 25, which forms the valve stem of the valve and signal 26, which rod projects downward through the box top and through the top of the coffin 10, a hole being left in the coffin for this purpose. The valve stem projects upwardly through the valve 26, and just above its upper end is a forked clutch 27 which has spring members and is secured to the top of the cap 21. The members of the forked clutch 27 have upwardly inclined teeth 28 on their inner sides, and the distance between the opposite teeth is less than the diameter of the valve rod or stem, so that if the valve rod or stem is pushed upward between the members of the fork, the teeth will engage it and prevent it from being pulled down. It will be seen that as the members are springy, any attempt to pull down the rod will only cause the teeth to be more firmly embedded in it. The object of this arrangement is to prevent the victim in the coffin from pulling down the rod and closing the air ports in case he should, in his paroxysms of agony incident to his discovery of his condition, grasp the valve rod. If desired, a pipe 29 may be extended from the lower end of the pipe 13 through the coffin top and to a point near the mouth and nose of the corpse, so that in case there is any tendency to revive, the air may be applied where it will do the most good.

The operation of the apparatus is as follows:—The coffin and its corpse are placed in the box 11 and deposited in the grave in the usual manner. The pipe 13 is then screwed to the nipple or cap 12, and the rod 25 pushed down through the pipe and through a hole in the coffin top, so that it rests on the forehead of the deceased. The valve 26 is pushed down and fastened so as to tightly close the ports 17, the rod 25 is cut off at the right length, unless it happens to be just the right length, the cap 21 is fastened in place, and the grave filled. If after a sufficient lapse of time everything remains in its normal condition, it may be safely presumed that the party buried is really dead, and the pipe 13 may then be unscrewed and removed and the whole apparatus applied to another coffin. If, however, the party buried should revive, the first thing he would naturally do would be to raise his head and lift the valve 26 off the ports 17, thus admitting air to the coffin through the hole 19, ports 17, and pipe 13, as shown by the arrows in Fig. 3, while the clutch 27 would catch the rod 25 and hold it up. When this action above described takes place, the valve 26 is raised to a position opposite the transparent portion of the case, and the valve should be made of some bright color so that it can be readily seen. Thus the valve 26 also has the office of a signal. The grave will, of course, be watched for a certain period, and in case the signal should be seen, steps could be at once taken to rescue the victim. It will be observed that the valve 26, in its normal position, tightly closes the ports 17, and the arrangement of the ports 17 and flange 16 is such that a party cannot run a stick or other object up through the hole 19 and lift the valve.

Having thus described my invention, I claim as new and desire to secure by Letters Patent—

1. A grave signal, comprising an air pipe adapted to communicate with the interior of a coffin, a movable rod extending longitudinally through the pipe and adapted to project into the coffin, and a valve secured to the said rod and adapted to normally cut off the air pipe from communication with the atmosphere, substantially as described.

2. A grave signal, comprising an air pipe adapted to communicate with a coffin near the head end thereof, a movable rod extending longitudinally through the pipe and adapted to project into the coffin to rest on the head of the buried person, a casing located at the upper end of the air pipe and communicating therewith, said casing having openings whereby it may communicate with the surrounding air, and a valve secured to the rod and adapted to normally close the said openings of the casing, substantially as described.

3. A grave signal, comprising an air pipe adapted to communicate with the interior of a coffin, a movable rod extending longitudinally through the pipe and adapted to project into the coffin, a casing located at the upper end of the air pipe and communicating therewith, said casing having openings whereby it may communicate with the surrounding air, the casing being further provided with a transparent middle portion, a valve secured to the rod and adapted to normally lie in the lower portion of the casing and close the openings thereof, and a clutch to engage and hold the rod when raised, substantially as described.

4. A grave signal, comprising an air pipe, a case carried at the upper end of the pipe and provided with air ports in its lower part and with a transparent portion, a valve rod extending longitudinally through the pipe, and a combined valve and signal carried by the rod and adapted to normally close the ports in the case, substantially as described.

5. A grave signal, comprising an air pipe to connect with the top of a coffin, a case at the top of the pipe, the case having a transparent portion, air ports in its lower part and a projecting flange below the ports, a valve rod extending longitudinally through the pipe, a valve carried by the rod and adapted to normally close the ports, and a casing encircling the pipe and the lower end of the transparent case, the case being perforated to admit air, substantially as described.

6. The combination, with the case, the longitudinally-movable guide rod and the air pipe containing the rod, of the forked clutch arranged adjacent to the rod and provided with teeth on its inner side to engage the rod, substantially as described.

HUBERT DEVEAU.

Witnesses:
WARREN B. HUTCHINSON,
JNO. M. RITTER.